(12) United States Patent
Tokuyama (10) Patent No.: US 11,671,568 B2
(45) Date of Patent: Jun. 6, 2023

(54) METHOD FOR CONTROLLING PROJECTOR, AND PROJECTOR

(71) Applicant: SEIKO EPSON CORPORATION, Tokyo (JP)

(72) Inventor: Tetsuro Tokuyama, Yufu (JP)

(73) Assignee: Seiko Epson Corportation, Tokyo (JP)

( * ) Notice: Subject to any disclaimer, the term of this patent is extended or adjusted under 35 U.S.C. 154(b) by 203 days.

(21) Appl. No.: 17/032,101

(22) Filed: Sep. 25, 2020

(65) Prior Publication Data

US 2021/0099680 A1 Apr. 1, 2021

(30) Foreign Application Priority Data

Sep. 26, 2019 (JP) .............................. JP2019-175241

(51) Int. Cl.
*G03B 21/14* (2006.01)
*H04N 9/31* (2006.01)
*G06F 3/01* (2006.01)

(52) U.S. Cl.
CPC .............. *H04N 9/31* (2013.01); *G03B 21/14* (2013.01); *G06F 3/01* (2013.01)

(58) Field of Classification Search
CPC ......... G03B 21/14; H04N 9/3155; H04N 9/31
See application file for complete search history.

(56) References Cited

U.S. PATENT DOCUMENTS

2004/0212787 A1 10/2004 Kida et al.
2006/0279944 A1 12/2006 Burnett et al.
2014/0043590 A1 2/2014 Ozawa

FOREIGN PATENT DOCUMENTS

| JP | 2002-287249 A | 10/2002 |
| JP | 2004-348109 A | 12/2004 |
| JP | 2005-017583 A | 1/2005 |
| JP | 2006-524361 A | 10/2006 |

*Primary Examiner* — Ryan D Howard
(74) *Attorney, Agent, or Firm* — Dority & Manning, P.A.

(57) ABSTRACT

A method for controlling a projector controls, via a control circuit, a projector having an input device accepting a startup operation giving an instruction to start up and a stop operation giving an instruction to stop. The method includes: starting startup processing an response to the startup operation and subsequently shifting to a preparation state to preparing for a normal state; setting a task of stop processing in response to the stop operation in the preparation state; and executing the task in response to finishing of the preparation state.

12 Claims, 6 Drawing Sheets

METHOD FOR CONTROLLING PROJECTOR, AND PROJECTOR

The present application is based on, and claims priority from JP Application Serial Number 2019-175241, filed Sep. 26, 2019, the disclosure of which is hereby incorporated by reference herein in its entirety.

BACKGROUND

1. Technical Field

The present disclosure relates to a method for controlling a projector, and a projector.

2. Related Art

JP-A-2005-17583 discloses a projector which displays how long it will take until warmup finishes via a display unit according to the state of progress of warm of the light source lamp after the power switch is turned on.

Generally, in the projector, the power cannot be turned off even when the power switch is operated in a preparation state before a normal state. Therefore, to turn off the power, the user needs to wait for the preparation state to finish.

SUMMARY

A first aspect is directed to a method for controlling a projector, the method controlling, via a control circuit, a projector having an input device accepting a startup operation giving an instruction to start up and a stop operation giving an instruction to stop. The method includes: starting startup processing in response to the startup operation and subsequently shifting to a preparation state to prepare for a normal state; setting a task of stop processing in response to the stop operation in the preparation state; and executing the task in response to finishing of the preparation state.

A second aspect is directed to the method according to the first aspect, in which the method may further include notifying a user that the task is set, during the setting of the task.

A third aspect is directed to the method according to the second aspect, in which a notification image showing that the task is set may be projected to notify the user that the task is set.

A fourth aspect is directed to the method according to the third aspect, in which the notification image may include information representing a remaining time until execution of the task.

A fifth aspect is directed to the method according to the second aspect, in which a notification signal representing that the task is set may be outputted to notify the user that the task is set.

A sixth aspect is directed to the method according to the fifth aspect, in which the notification signal may be selectively outputted during interruption of projection.

A seventh aspect is directed to the method according to the fifth or sixth aspect, in which the notification signal may be expressed by at least one of light or sound.

An eighth aspect is directed to the method according to the first to seventh aspects, in which the input device may accept a cancel operation giving an instruction to cancel the task, and the task may be cancelled in response to the cancel operation during the setting of the task.

A ninth aspect is directed to a projector including: an input device accepting a startup operation giving an instruction to start up and a stop operation giving an instruction to stop; and a control circuit starting startup processing in response to the startup operation, subsequently shifting to a preparation state to prepare for a normal state, setting a task of stop processing in response to the stop operation in the preparation state, and executing the task in response to finishing of the preparation state.

DESCRIPTION OF EXEMPLARY EMBODIMENTS

Embodiments will now be described with reference to the drawings. In the drawings, identical or similar elements are denoted by identical or similar reference signs and duplication of explanation is avoided.

First Embodiment

Figure 1:
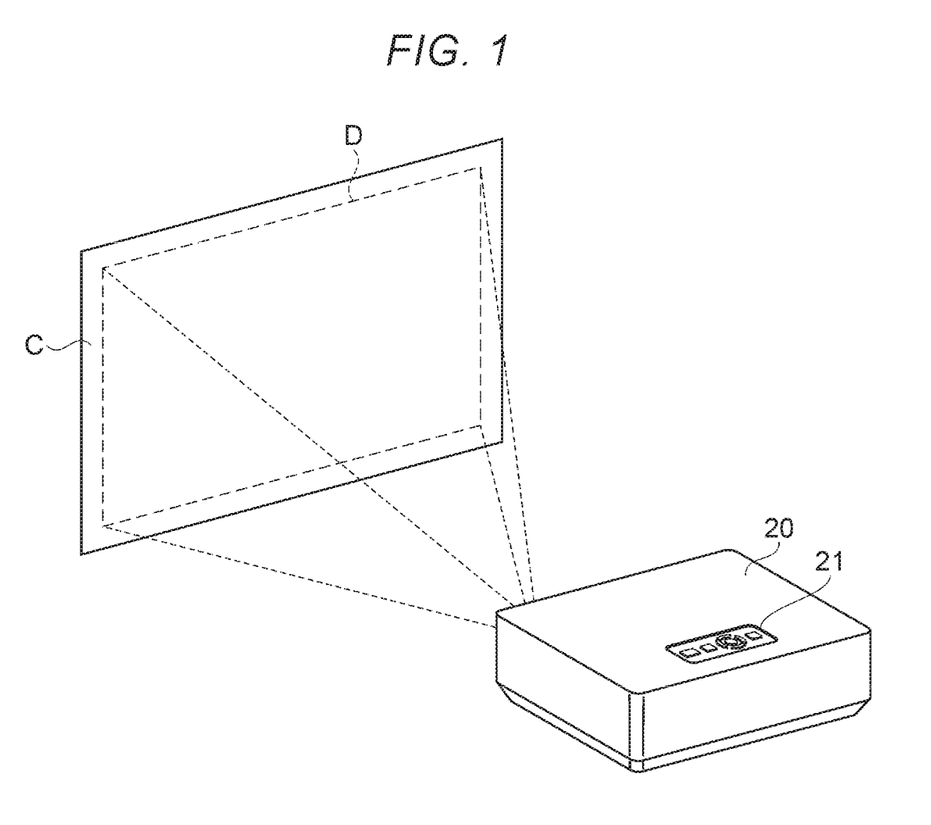
FIG. 1 is a perspective view explaining a projector according to a first embodiment.

As shown in FIG. 1, a projector 20 according to a first embodiment is a display device which projects light representing an image D onto a screen C and thus displays the image D. The projector 20 is provided with an image signal representing the image D, for example, from an external device, not illustrated, having the function of outputting an image signal. The projector 20 may also be provided with the image signal from another medium. The projector 20 may also generate the image signal.

Figure 2:
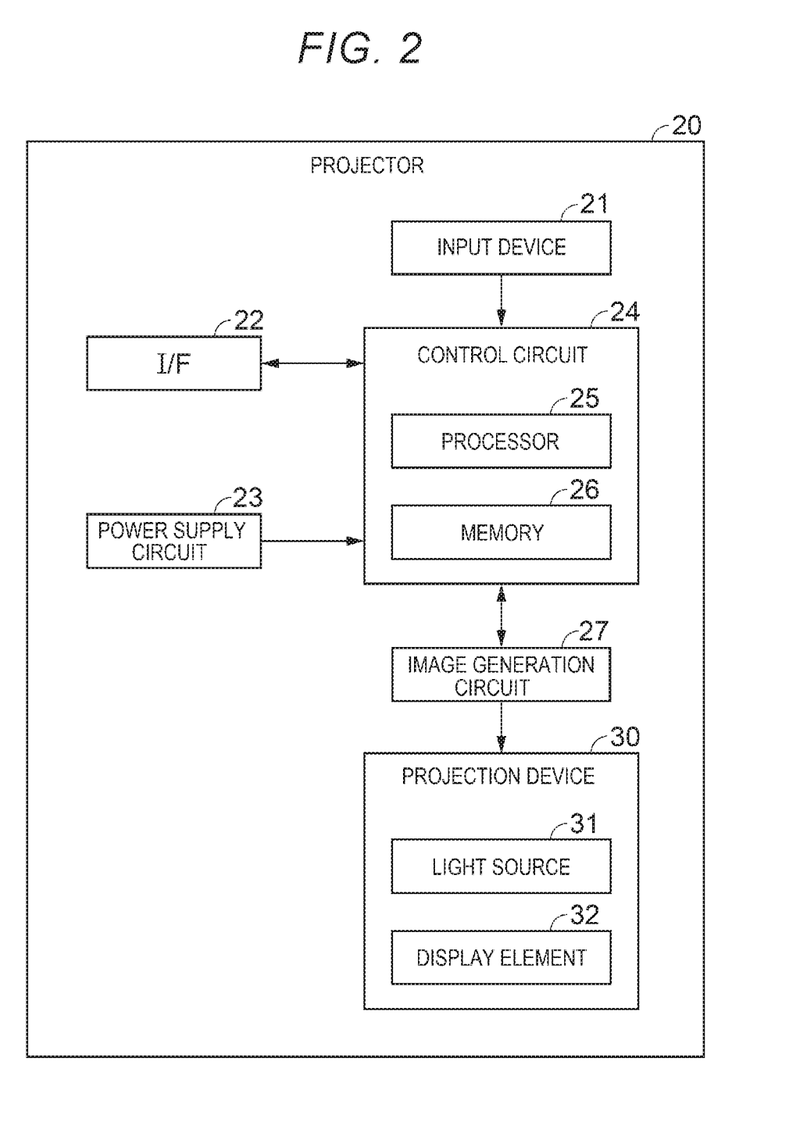
FIG. 2 is a block diagram explaining a basic configuration of the projector according to the embodiment.

As shown in FIG. 2, the projector 20 has an input device 21, an interface (I/F) 22, a power supply circuit 23, a control circuit 24, an image generation circuit 27, and a projection device 30. The input device 21 accepts an operation by a user and outputs a signal corresponding to the operation by the user to the control circuit 24. As the input device 21, various input devices including a switch such as a push button, a touch sensor, or a keyboard, and a pointing device such as a mouse, a touch panel, a digitizer, or a distance measuring sensor, can be employed. The input device 21 need not be provided in the casing of the projector 20. The input device 21 can include a wireless or wired remote controller.

The input device 21 accepts a startup operation giving an instruction to start up the projector 20 and a stop operation giving an instruction to stop the projector 20. The startup operation means, for example, that the power button of the input device 21 is pressed by the user while the projector 20 is in a stop state. The input device 21 outputs a startup signal giving an instruction to start startup processing to the control circuit 24 in response to the startup operation. The stop operation means, for example, that the power button of the input device 21 is pressed by the user while the projector 20 is in a startup state. The input device 21 outputs a stop signal giving an instruction to start stop processing to the control circuit 24 in response to the stop operation. The startup operation and the stop operation may be various operations individually defined in the projector 20.

The I/F 22 takes in an image signal, for example, from an external device, not illustrated, and outputs the image signal to the control circuit 24. The I/F 22 may establish a communication link with an external device under the control of the control circuit 24. The I/F 22 can include, for example, an antenna transmitting and receiving a radio signal, a receptacle in which a cable plug is inserted, and a communication circuit processing a signal transmitted to and from the external device, or the like.

The power supply circuit 23 has a power terminal supplied with electric power, for example, from a power grid. The power supply circuit 23 converts AC power supplied to the power terminal into DC power and supplies the DC power as operating power to each part of the projector 20. The operating power is the power that is necessary for the projector 20 to project an image. The power supply circuit 23 switches between an on-state to supply the operating power and an off-state to stop supplying the operating power, under the control of the control circuit 24. When electric power is supplied to the power terminal, the power supply circuit 23 supplies standby power that is lower than the operating power, to the control circuit 24.

The control circuit 24 has, for example, a processor 25 formed of a processing circuit such as a central processing unit (CPU), and a memory 26 formed of a storage device such as a semiconductor memory. The processor 25 forms a processing device of a computer that performs necessary arithmetic processing for the operation of the projector 20. The processor 25 executes, for example, a control program stored in the memory 26. Thus, the control circuit 24 implements various functions described in the embodiment and controls each part of the projector 20. The memory 26 is, for example, a computer-readable storage medium storing a control program representing a series of processing that is necessary for the operation of the projector 20, and various data. The memory 26 is not limited to a non-volatile auxiliary storage device and can include a volatile main storage device such as a register or a cache memory. The control circuit 24 may be formed of one piece of hardware or a plurality of separate pieces of hardware.

The processor 25 starts the startup processing in response to the startup operation by the user to the input device 21. That is, in response to a startup signal inputted in the stop state, the processor 25 controls the power supply circuit 23 to switch to the on-state and thus supply the operating power to each part of the projector 20. The stop state is the state where standby power is supplied from the power supply circuit 23 in the off-state. In the stop state, the processor 25 is in a standby state to stand by for interrupt processing from outside in the stop state. The processor 25 shifts to the preparation state after starting the startup processing. The preparation state is the state where preparation for the normal state, which is the normal startup state, is made. A preparation time, which is the time length of the preparation state, is defined in advance by preparation time information stored in the memory 26.

The processor 25 starts the stop processing in response to the stop operation by the user to the input device 21. That is, in response to a stop signal inputted in the normal state, the processor 25 starts the stop processing to shift to the stop state. However, when a stop signal is inputted in the preparation state, the processor 25 does not immediately start the stop processing. The processor 25 sets a task of stop processing in the memory 26 in response to the stop operation in the preparation state. The processor 25 executes the task set in the memory 26 in response to the finishing of the preparation state. That is, the processor 25 executes the task as a predetermined preparation time has passed from the time point of shift to the preparation state.

The image generation circuit 27 generates the image D to be projected onto the screen C, under the control of the control circuit 24. Specifically, the image generation circuit 27 generates an image signal representing the image D, based on an image signal inputted to the I/F 22 and a computer graphic generated by the control program of the control circuit 24. The image generation circuit 27 successively outputs the generated image signal to the projection device 30. The image generation circuit 27 has a rendering engine, a graphic memory and the like. The image generation circuit 27 may also function as a circuit forming a part of the control circuit 24.

Figure 3:
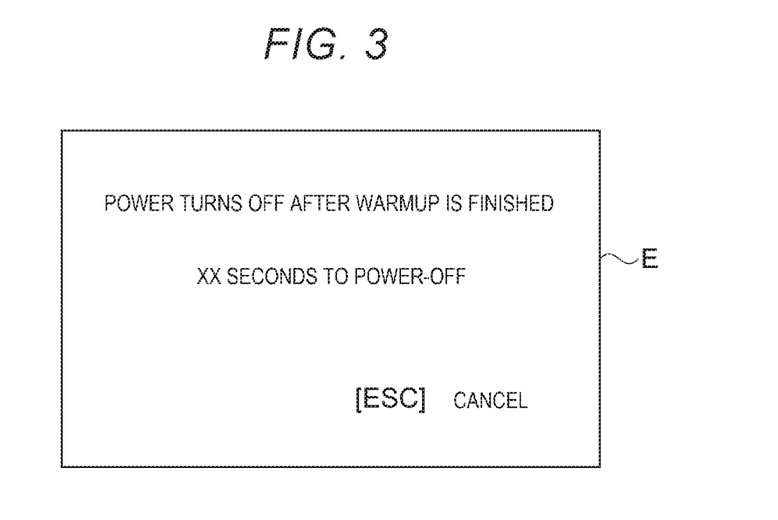
FIG. 3 explains an example of a notification image.

As shown in FIG. 3, the image generation circuit 27 generates a notification image E showing that a task of stop processing is set in the memory 26, under the control of the control circuit 24. The notification image E can be implemented, for example, as an on-screen display (OSD) superimposed on the image D. In the example shown in FIG. 3, the notification image E includes a task setting message "Power turns off after warmup is finished", a remaining time message "xx seconds to power-off", and a cancel menu "[ESC] cancel". The task setting message notifies the user that the task is set, during the setting of the task of stop processing. The remaining time message notifies the user of the remaining time until the execution of the task of stop processing. In the example shown in FIG. 3, the notification image E includes "xx seconds" as information representing the remaining time. The cancel menu explains a cancel operation giving an instruction to cancel the task of stop processing.

Therefore, the input device 21 accepts a cancel operation giving an instruction to cancel the task of stop processing. The cancel operation means, for example, that the escape button of the input device 21 is pressed by the user during the setting of the task of stop processing in the memory 26. In response to the cancel operation, the input device 21 outputs a cancel signal giving an instruction to cancel the task set in the memory 26, to the control circuit 24. The processor 25 cancels the task of stop processing in response to the cancel signal. That is, the processor 25 cancels the task in response to the cancel operation made during the setting of the task in the memory 26.

As shown in FIG. 2, the projection device 30 has a light source 31 and a display element 32 such as a liquid crystal light valve having a plurality of pixels. The projection device 30 also has an optical system, not illustrated, including a lens, a mirror and the like. The light source 31 may be one of various discharge-type lamps or may be a laser light source. The light emitted from the light source 31 is introduced into the display element 32 by the optical system. The display element 32 modulates the introduced light according to image data inputted from the image generation circuit 27. The projection device 30 projects the light modulated via the display element 32, as the image D, using the optical system. Other methods that can be employed by the projection device 30 include the method of using a mirror device to scan the screen C with the modulated light, and the method of using a digital micromirror device to control the reflection of light at each pixel.

Figure 4:
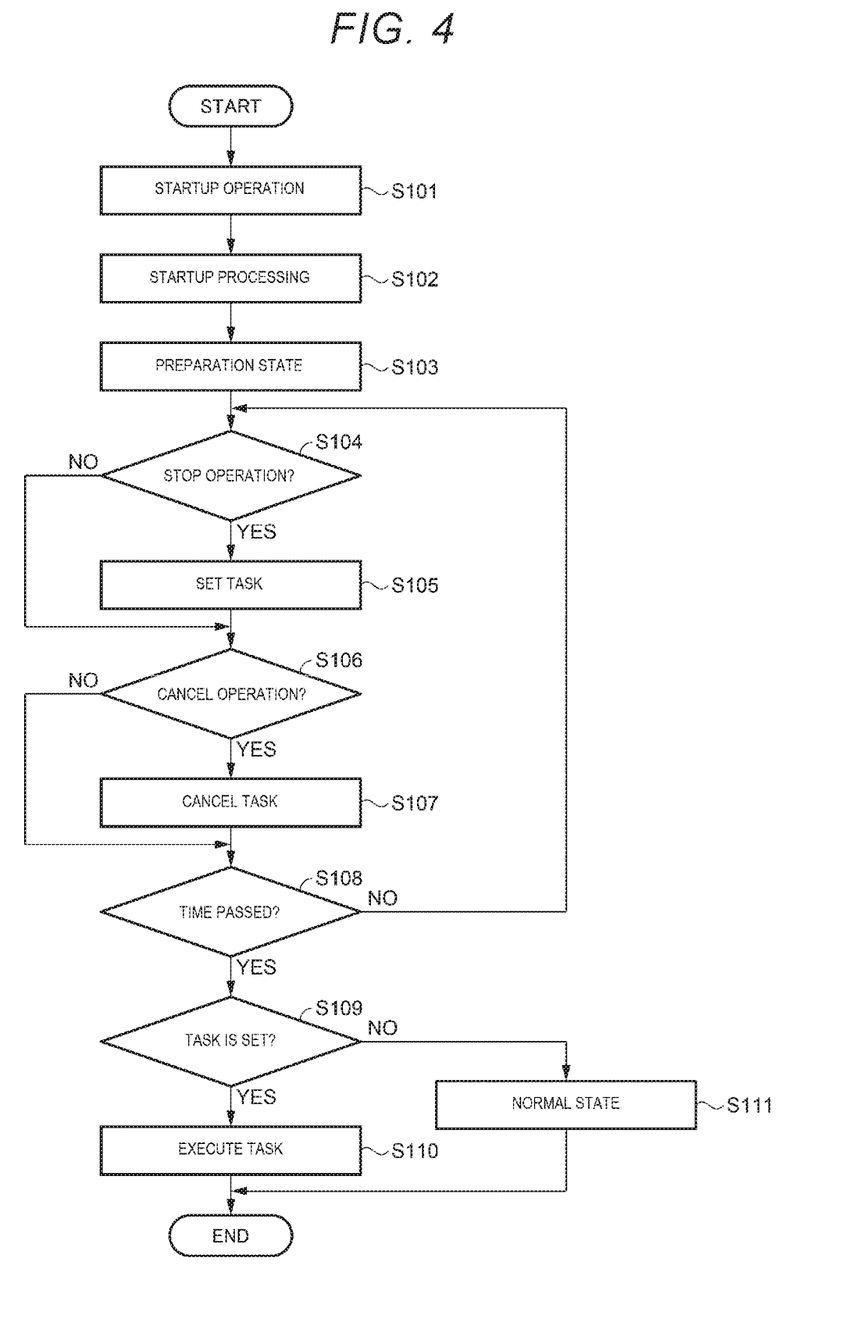
FIG. 4 is a flowchart explaining the operation of the projector according to the first embodiment.

As a method for controlling the projector 20 according to the first embodiment, an example of the operation of the projector 20 will now be described with reference to the flowchart of FIG. 4. When the power supply circuit 23 is supplied with electric power and the control circuit 24 thus starts driving and shifts to the stop state, where standby power is supplied, the series of processing shown in FIG. 4 is started.

In step S101, the input device 21 accepts the startup operation by the user. That is, the input device 21 outputs a startup signal giving an instruction to start the startup processing to the control circuit 24 in response to the startup operation.

In step S102, the control circuit 24 starts the startup processing according to the control program stored in the memory 26, in response to the startup signal inputted in step S101. The processor 25 switches the power supply circuit 23 into the on-state to start supplying the operating power to the input device 21, the I/F 22, the control circuit 24, the image generation circuit 27, the projection device 30 and the like. For example, the processor 25 controls the projection device 30 supplied with the operating power in such a way as to drive the light source 31 and the display element 32. The processor 25 also reads out and reflects the previous setting information from the memory 26.

In step S103, the control circuit 24 shifts to the preparation state to prepare for the normal state. The preparation state is, for example, the state of waiting for the completion of warmup of the light source 31. For example, the processor 25 shifts to the preparation state in response to checking the driving of the light source 31. The preparation state may also be, for example, the state of waiting for the operation of software such as reflection of the previous setting and verification of consistency.

In step S104, the control circuit 24 determines whether the input device 21 has accepted the stop operation or not. That is, when the stop signal is inputted from the input device 21, the processor 25 determines that the stop operation has been accepted, and shifts the processing to step S105. Meanwhile, when the stop signal is not inputted from the input device 21, the processor 25 determines that the stop operation has not been accepted, and shifts the processing to step S106.

In step S105, the control circuit 24 sets a task of stop processing in the memory 26. That is, in response to the stop operation in the preparation state, the processor 25 sets a task of stop processing. Specifically, the processor 25 turns on a reservation flag indicating that the task of stop processing is reserved, and thus stores the task into the memory 26.

In step S106, the control circuit 24 determines whether the input device 21 has accepted the cancel operation or not. That is, when a cancel signal is inputted from the input device 21, the processor 25 determines that the cancel operation has been accepted, and shifts the processing to step S107. Meanwhile, when a cancel signal is not inputted from the input device 21, the processor 25 determines that the cancel operation has not been accepted, and shifts the processing to step S108.

In step S107, the control circuit 24 cancels the task set in step S105. That is, the processor 25 cancels the task set in the memory 26 in response to the cancel operation made during the setting of the task of stop processing. Specifically, the processor 25 turns off the reservation flag indicating that the task of stop processing is reserved, and thus deletes the task stored in the memory 26.

In step S108, the control circuit 24 determines whether a predetermined preparation time has passed from the time point of shifting to the preparation state in step S103 or not. That is, when the time measured from the time point of shifting to the preparation state amounts to the preparation time, the processor 25 determines that the preparation time has passed, and shifts the processing to step S109. Meanwhile, when the time measured from the time point of shifting to the preparation state does not amount to the preparation time, the processor 25 determines that the preparation time has not passed yet, and returns the processing to step S104.

In step S109, the control circuit 24 determines whether the task is set in the memory 26 or not. When the reservation flag in the memory 26 is on, the processor 25 determines that the task is set, and shifts the processing to step S110. Meanwhile, when the reservation flag in the memory 26 is off, the processor 25 determines that a task is not set, and shifts the processing to step S111.

In step S110, the control circuit 24 executes the task of stop processing. That is, when the task is set, the processor 25 executes the task set in the memory 26 in response to the finishing of the preparation state with the lapse of the preparation time. In the stop processing, the processor 25 refreshes the display element 32 and stores the current various settings into the memory 26, and subsequently switches the power supply circuit 23 into the off-state. Thus, the control circuit 24 shifts to the stop state, where the standby power is supplied from the power supply circuit 23.

In step S111, the control circuit 24 shifts to the normal state in response to the finishing the preparation state with the lapse of the preparation time. The normal state is defined as the state during the period from the time point when the preparation state is finished to the next time the input device 21 accepts the stop operation. The control circuit 24 immediately starts the stop processing in response to the stop operation in the normal state.

As described above, in the projector 20, even when the stop operation is made in the preparation state, where the stop processing cannot be immediately executed in response to the stop operation, a task of stop processing is set in response to the stop operation. Thus, even when the user mistakenly makes the startup operation on the projector 20, carrying out the stop operation in the preparation state causes the projector 20 to execute the task of stop processing in response to the finishing of the preparation state. Therefore, the user need not wait for the preparation state to finish. Also, the projector 20 notifies the user that the task is set, during the setting of the task of stop processing. This enables the user to recognize that the stop processing is reserved.

Second Embodiment

Figure 5:
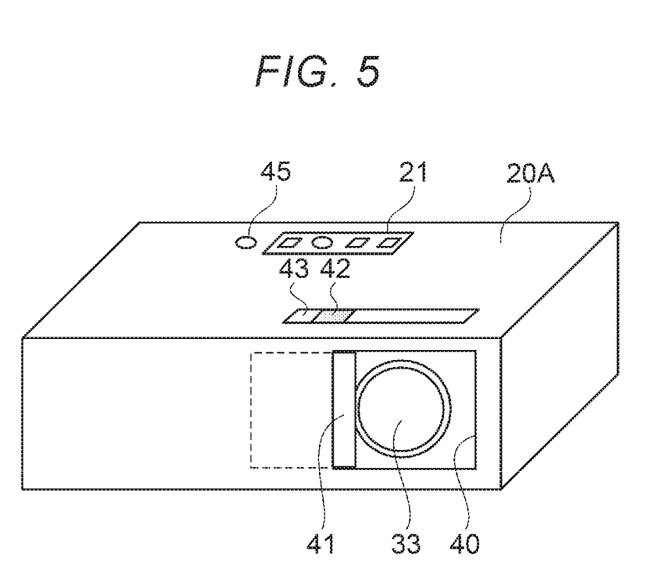
FIG. 5 is a perspective view explaining a projector according to a second embodiment.

As shown in FIG. 5, a projector 20A according to a second embodiment differs from the first embodiment in that the projector 20A has a notification unit 45 notifying the user that the task of stop processing is set, and the like. Configurations, processing, actions and effects in the second embodiment that are not described here are similar to those in the first embodiment and therefore will not be described further.

The projector 20A has a shutter 41 opening and closing a window 40 in a casing, and a knob 42 sliding on a rail 43, interlocked with the shutter 41. The window 40 exposes a projection lens 33 arranged inside the casing of the projector 20A, to outside. The projection lens 33 is one of the optical systems in the projection device 30. The projection lens 33 projects light modulated by the display element 32, as the image D, to the outside of the casing. The shutter 41 moves in a unified manner with the knob 42 operated by the user and thus opens and closes the window 40.

Figure 6:
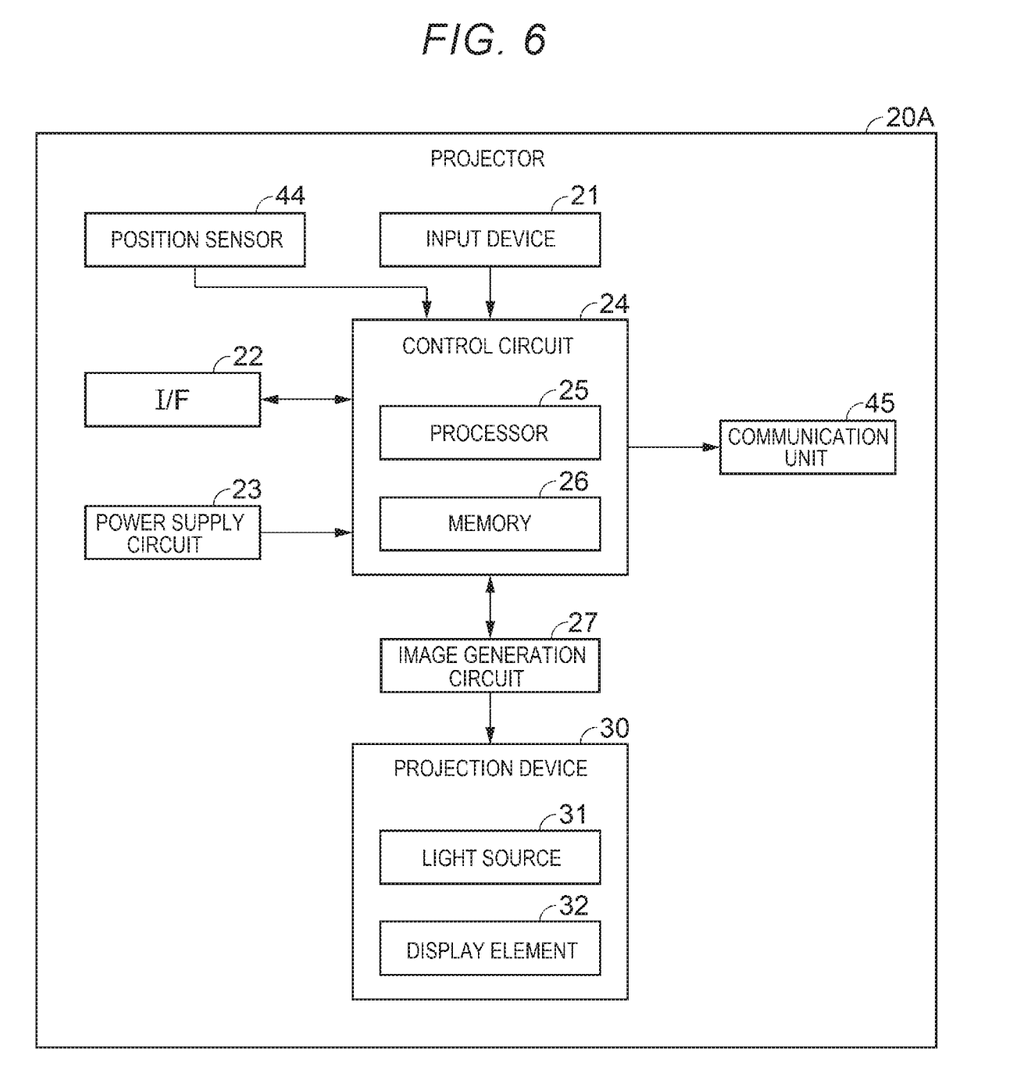
FIG. 6 is a block diagram explaining a basic configuration of the projector according to the second embodiment.

As shown in FIG. 6, the projector 20A has a position sensor 44 detecting the position of the shutter 41. As the position sensor 44, for example, a switch having a pair of terminals forming an open circuit and a short circuit according to the opening and closing of the shutter 41 can be employed. The position sensor 44 outputs the electric potential of the other terminal to the control circuit 24. The processor 25 determines whether the shutter 41 is in the closed state or not, based on the electric potential inputted from the position sensor 44. That the shutter 41 is in the closed state means that the projection by the projection device 30 is interrupted.

The notification unit 45 outputs a notification signal representing that the task of stop processing is set, during the setting of the task of stop processing. The notification signal can be expressed by at least one of light and sound. Therefore, for example, an indicator lamp such as a light-emitting diode or an output device such as a speaker can be employed as the notification unit 45.

For example, the control circuit 24 determines that the shutter 41 is in the closed state and that the projection by the projection device 30 is interrupted, according to the output from the position sensor 44. The control circuit 24 selectively outputs a notification signal via the notification unit 45 during the interruption of the projection. Thus, even when the shutter 41 is closed and therefore the notification image E cannot be projected, the control circuit 24 can notify the user that the task of stop processing is set. The notification unit 45 may have a display device displaying, in real time, the remaining time until the execution of the task.

Other Embodiments

The first and second embodiments have been described above. However, the present disclosure is not limited to these embodiments. The configuration of each part may be replaced with any configuration having a similar function. Any configuration in the respective embodiments may be omitted or added within the technical scope of the present disclosure. In this way, based on such configurations, various alternative embodiments become clear to a person skilled in the art.

For example, in the foregoing first and second embodiments, the preparation state may be defined as being started immediately after the start of the startup processing without waiting for the driving of the light source 31 to be checked. Alternatively, the preparation state may be defined as being started after a predetermined time from the start of the startup processing. The control circuit 24 may ignore a stop signal inputted within a predetermined time after a stop signal is inputted in the preparation state. Thus, even when the stop operation is carried out consecutively by mistake, ignoring a stop signal other than the first stop signal can prevent the projector 20 from malfunctioning. The control circuit 24 may also set a task of stop processing in response to two stop operations. In this case, the control circuit 24 may cause the projection device 30 to project, for example, a message "Press the power button again to turn the power off" or the like. This can prevent the projector 20 from malfunctioning.

In the second embodiment, the control circuit 24 may constantly notify the user that the task is set via the notification unit 45 during the setting of the task of stop processing, regardless of the opening and closing of the shutter 41. In this case, when the shutter 41 is open during the setting of the task, the control circuit 24 can notify the user that the task is set, separately via the notification image E and the notification signal. Also, when the shutter 41 is closed, the control circuit 24 may reduce the drive power of the light source 31, compared with when the shutter 41 is open.

The present disclosure also includes various other embodiments that are not described above, such as applying the above configurations to each other. The technical scope of the present disclosure is defined solely by matters specifying the present disclosure according to the appended claims that are reasonable based on the above description.

The contents derived from the foregoing embodiments will now be described as various aspects.

According to a first aspect, a method for controlling a projector controls, via a control circuit, a projector having an input device accepting a startup operation giving an instruction to start up and a stop operation giving an instruction to stop. The method includes: starting startup processing in response to the startup operation and subsequently shifting to a preparation state to prepare for a normal state; setting a task of stop processing in response to the stop operation in the preparation state; and executing the task in response to finishing of the preparation state. According to the first aspect, even when the stop operation is made in the preparation state, the task of stop processing is set in response to the stop operation and the task is executed in response to the finishing of the preparation state. Therefore, the user need not wait for the normal state in order to carry out the stop operation.

According to a second aspect, the method according to the first aspect may further include notifying a user that the task is set, during the setting of the task. According to the second aspect, the user can recognize that the stop processing is reserved.

According to a third aspect, in the method according to the second aspect, a notification image showing that the task is set may be projected to notify the user that the task is set. According to the third aspect, the notification image enables the user to recognize that the stop processing is reserved.

According to a fourth aspect, in the method according to the third aspect, the notification image may include information representing a remaining time until execution of the task. According to the fourth aspect, the user can recognize the time taken until the stop processing is started.

According to a fifth aspect, in the method according to the second aspect, a notification signal representing that the task is set may be outputted to notify the user that the task is set. According to the fifth aspect, the notification signal enables the user to recognize that the stop processing is reserved.

According to a sixth aspect, in the method according to the fifth aspect, the notification signal may be selectively outputted during interruption of projection. According to the sixth aspect, the user can recognize that the stop processing is reserved, even when an image is not projected.

According to a seventh aspect, in the method according to the fifth or sixth aspect, the notification signal may be expressed by at least one of light or sound. According to the seventh aspect, sound, light or the like enables the user to recognize that the stop processing is reserved.

According to an eighth aspect, in the method according to the first to seventh aspects, the input device may accept a cancel operation giving an instruction to cancel the task, and the task may be cancelled in response to the cancel operation during the setting of the task. According to the eighth aspect, the task of stop processing can be cancelled even when the stop operation is mistakenly made.

According to ninth aspect, a projector includes an input device accepting a startup operation giving an instruction to start up and a stop operation giving an instruction to stop; and a control circuit starting startup processing in response to the startup operation, subsequently shifting to a preparation state to prepare for a normal state, setting a task of stop processing in response to the stop operation in the preparation state, and executing the task in response to finishing of the preparation state. According to the ninth aspect, even when the stop operation is made in the preparation state, the task of stop processing is set in response to the stop operation and the task is executed in response to the finishing of the preparation state. Therefore, the user need not wait for the normal state in order to carry out the stop operation.

What is claimed is:

1. A method for controlling, via a control circuit processor, a projector having an input device accepting a startup operation giving an instruction to start up and a stop operation giving an instruction to stop, the method comprising:
    starting startup processing in response to the startup operation and subsequently shilling to a preparation state to prepare for a normal state;
    setting a task of stop processing in response to the stop operation in the preparation state;
    executing the task in response to finishing of the preparation state; and
    notifying a user that the task is set, during the setting of the task,
    wherein a notification image showing that the task is set is projected to notify the user that the task is set.

2. The method for controlling the projector according to claim 1, wherein
    the notification image includes information representing a remaining time until execution of the task.

3. The method for controlling the projector according to claim 1, wherein
    a notification signal representing that the task is set is outputted to notify the user that the task is set.

4. The method for controlling the projector according to claim 3, wherein
    the notification signal is selectively outputted during interruption of projection.

5. The method for controlling the projector according to claim 3, wherein
    the notification signal is expressed by at least one of light or sound.

6. The method for controlling the projector according to claim 1, wherein
    the input device accepts a cancel operation giving an instruction to cancel the task, and
    the task is cancelled in response to the cancel operation during the setting of the task.

7. A projector comprising:
    an input device accepting a startup operation giving an instruction to start up and a stop operation giving an instruction to stop; and
    a control processor programmed for starting startup processing in response to the startup operation, subsequently shifting to a preparation state to prepare for a normal state, setting a task of stop processing in response to the stop operation in the preparation state, executing the task in response to finishing of the preparation state, and notifying a user that the task is set, during the setting of the task,
    wherein a notification image showing that the task is set is projected to notify the user that the task is set.

8. The projector according to claim 7, wherein
    the notification image includes information representing a remaining time until execution of the task.

9. The projector according to claim 7, wherein
    a notification signal representing that the task is set is outputted to notify the user that the task is set.

10. The projector according to claim 9, wherein
    the notification signal is selectively outputted during interruption of projection.

11. The projector according to claim 9, wherein
    the notification signal is expressed by at least one of light or sound.

12. The projector according to claim 7, wherein
    the input device accepts a cancel operation giving an instruction to cancel the task, and
    the task is cancelled in response to the cancel operation during the setting of the task.

* * * * *

UNITED STATES PATENT AND TRADEMARK OFFICE
CERTIFICATE OF CORRECTION

| | | |
|---|---|---|
| PATENT NO. | : 11,671,568 B2 | Page 1 of 1 |
| APPLICATION NO. | : 17/032101 | |
| DATED | : June 6, 2023 | |
| INVENTOR(S) | : Tetsuro Tokuyama | |

It is certified that error appears in the above-identified patent and that said Letters Patent is hereby corrected as shown below:

On the Title Page

Item (73), please change the Assignee from "Seiko Epson Corportation, Tokyo (JP)" to "Seiko Epson Corporation, Tokyo (JP)".

Signed and Sealed this
Twenty-fourth Day of September, 2024

Katherine Kelly Vidal
*Director of the United States Patent and Trademark Office*